United States Patent [19]

Versteegh

[11] Patent Number: 5,453,285
[45] Date of Patent: Sep. 26, 1995

[54] PROCESS FOR MEMBRANE FILTRATION OF MASH TO PRODUCE WORT

[75] Inventor: Christiaan W. Versteegh, Delft, Netherlands

[73] Assignee: Heineken Technical Services B.V., Amsterdam, Netherlands

[21] Appl. No.: 87,737

[22] PCT Filed: Jan. 10, 1991

[86] PCT No.: PCT/NL92/00005
§ 371 Date: Sep. 3, 1993
§ 102(e) Date: Sep. 3, 1993

[87] PCT Pub. No.: WO92/12230
PCT Pub. Date: Jul. 23, 1992

[30] Foreign Application Priority Data

Jan. 11, 1991 [NL] Netherlands ............... 9100049

[51] Int. Cl.[6] ............... C12C 7/04; C12C 7/06; C12C 7/165; C12C 7/22
[52] U.S. Cl. ............... 426/29; 426/30; 426/489; 426/495
[58] Field of Search ............... 426/30, 16, 29, 426/489, 495

[56] References Cited

U.S. PATENT DOCUMENTS

| 2,127,759 | 6/1934 | Silhavy | 426/30 |
| 2,309,989 | 2/1943 | Saltzman . | |
| 3,216,345 | 11/1965 | Rigby . | |
| 3,989,848 | 11/1976 | Moll et al. | 426/30 |
| 4,844,932 | 7/1989 | Daoud | 426/489 |

FOREIGN PATENT DOCUMENTS

| 0265152 | 4/1988 | European Pat. Off. . |
| 1222454 | 8/1966 | Germany . |

OTHER PUBLICATIONS

Article—"Determination of the filterability of Wort and beer" (Nov. 1984), pp. 175–176 Brauweit Int'l.

Primary Examiner—Donald E. Czasa
Assistant Examiner—Curtis E. Sherrer
Attorney, Agent, or Firm—Pearne, Gordon, McCoy & Granger

[57] ABSTRACT

This invention relates to a process for the preparation of wort starting from mash, comprising the separation of spent grain from the mash to form a clear wort in at least one membrane filtration unit having a pore size of the filter not exceeding 2.0 μm, if desired addition of hops to the wort and boiling of the wort.

16 Claims, 2 Drawing Sheets

PROCESS FOR MEMBRANE FILTRATION OF MASH TO PRODUCE WORT

BACKGROUND OF THE INVENTION

This invention relates to a process for the preparation of wort starting from mash, comprising the separation of spent grain from the mash. More in particular, the invention relates to a continuous process for the preparation of wort.

When making beverages from cereals, more in particular when brewing beer, wort is used. A conventional preparation of wort occurs by mixing the starting materials, e.g., comprising unmalted grain (for example maize). The solid materials are first crushed (pulverized) and then mixed with the water. The resulting suspension is kept for some time at a temperature of at least 40° C. in the presence of an enzyme source, e.g., malt. Gelatinization and liquefaction thereby occur. In a next step the enzymatic conversion of the mixture (mash) is continued after supplementary addition of malt and/or an external enzyme source.

It is also possible to prepare wort on the basis of malt and water. Then the first step is omitted.

The product thus obtained consists mainly of water, insoluble components of the raw materials, as well as soluble components, such as fermentable and unfermentable sugars and proteins. In the conventional method this mixture is filtered to remove the insoluble components, the spent grain. The filtrate or extract is the wort. For brewing beer, hops are then added to the wort, which is boiled. The flakes formed, if any, are removed, and the wort is cooled to about 8° C. and fermented.

European patent application 0 265 152 discloses the filtration of wort using a membrane having a pore diameter of from 10.0 to 100.0 μm. As appears from the text of this publication, the membrane is intended to separate the spent grain from the mash, the advantage residing in that a smaller particle size of the starting products can thus be used. This has advantages relative to the extraction efficiency of the sugars from the raw materials.

The membrane filtration according to this publication does not result in a clear wort which is suitable for further use. In particular, it appears from the text of the application that the wort as initially produced is not free from suspended particles, so that a supplementary filtration is required. This is a drawback of this method. Moreover, the process as described in this publication cannot be carried out continuously.

The object of this invention is to provide a process for the preparation of wort starting from mash, the separation of the spent grain from the mash to form a clear wort, which process has the advantage that it can be carried out continuously, while furthermore the separation takes place at a higher yield of extract.

SUMMARY AND DESCRIPTION OF THE INVENTION

The invention is characterized in that spent grain is separated from the mash in at least one membrane filtration unit having a pore size of the membrane not exceeding 2.0 μm, if desired followed by addition of hops to the wort and boiling of the wort.

Surprisingly, it has been found that an improved separation of the spent grain from the mash is obtained by using the process according to the invention. Not only is the wort clear, which means that it can be mixed with hops and boiled without further purification, but the yield of extract is also better. Moreover, much less fouling of the membrane occurs with the process according to the invention than with the method according to European patent application 0 265 152. The latter has the advantage that the process can be carried out continuously, since much less cleaning of the membranes is required.

The membrane filtration is carried out by using at least one membrane filter, but preferably by using a multi-stage filter, e.g. a multi-stage counterflow filtering apparatus, such as a three-stage apparatus or a multi-stage cross-flow filtering apparatus.

The membranes in the membrane filter have a pore size not exceeding 2.0 μm, preferably ranging from 0.1 to 1.5 μm. Such a pore size results in an optimum activity of the filtration unit, because at this pore size a good clear wort is obtained with a high efficiency. The membrane filter also has a good self-cleaning capacity. The material of the membrane is not very critical. Of special importance is the mechanical stability at the temperature of the wort to be filtered. In addition, the material must be suitable for use in contact with foods. Particularly suitable are membranes on the basis of ceramic materials.

A surprising aspect of the process according to the invention is the fact that the particle size of the solid materials only has a slight effect on the activity of the membranes, contrary to what is suggested in the cited European patent application.

The wort obtained with the process according to the invention has a clarity measured as EBC units at 65° C. of from 0.25 to 5. The clear wort is mixed with hops, and the mixture is boiled. Flocculation of material, such as proteins and polyphenols, may then occur. If desired, these flakes are removed, e.g., with a separator or a 'whirlpool'. After cooling the wort to a temperature ranging from 2° to 25° C., preferably to about 8° C., the wort can be fermented to beer.

The boiling of the wort preferably takes place continuously, with recovery of at least part of the heat. Apparatuses suitable therefore are known from the literature. These apparatuses may be based, e.g., on multi-effect evaporators with a heat exchange of the spent gases with the wort.

The mash converted according to the invention to wort can be obtained in different ways, e.g., by a conventional treatment in batchwise operating mashers. Within the scope of the invention, however, the use of an apparatus for continuous mashing is preferred.

According to a preferred embodiment of the invention a plug flow reactor is used therefore, that is to say a reactor showing little back-mixing and pre-mixing of the reactants.

It is possible to carry out the process in one or more plug flow reactors. The number of reactors partly depends on the nature of the raw materials to be used.

When using unmalted grain two reaction steps are carried out, in the first of which the pulverized material is gelatinized and liquefied under the influence of an enzyme system. This enzyme system often originates from malt. In a second step malt and/or additional enzyme system is added, and further reaction occurs. It is thus necessary to use two reaction steps, which may advantageously be carried out in two reactors. When only malt is used, without unmalted grain, it is sufficient to carry out only the second reaction step, which can be done in one reactor.

The solid components, such as malt and unmalted grain, are first pulverized, e.g., in a hammer mill, to a particle size that can pass through screens with a mesh size of from 5 μm to 5 mm.

The pulverized solid materials are mixed with the water and fed to the reactor or reactors. When unmalted grain is used, a temperature ranging from 40° to 100° C. is maintained in a first reaction step. Gelatinization and liquefaction under the influence of the enzyme system present thereby occur. In the second reaction step malt and/or the enzyme source and water are added, together with the product obtained in the first reaction step. In this reaction step enzymatic conversion occurs. The temperature in this reaction step generally ranges from 30° to 80° C. When no unmalted grain is used, this is the only reaction step, and a mixture of malt and water is fed to this reaction step.

As plug flow reactor, various types of reactors may be used, in which connection it is of special importance that no unacceptable back-mixing and/or pre-mixing of the components occur. Examples thereof are tubular reactors and cascades of more or less ideally agitated tank reactors. A suitable type of reactor is formed by the so-called rotating disc contactor, which is a known type of column reactor as described in, e.g., Kirk-Othmer, Encyclopedia of Chemical Technology, Third Edition, Vol. 9, page 702.

Such a reactor generally consists of a column provided with a central agitator shaft having attached thereto 10 or more discs or plates. These discs or plates cover at least 80% of the cross section of the column. In general, this surface does not exceed 95%. By rotating the shaft and the discs in the column a proper dispersion of the solid matter in the liquid occurs.

In connection with the desired possibility to clean the column a system is preferably used in which the shaft can be easily removed, e.g., due to the absence of baffles in the column.

The use of a rotating disc contactor has the surprising advantage that the particle size of the raw materials can be adjusted almost independently of the apparatus used, without the occurrence of problems with settling or accumulation of solid matter. In combination with the use of membrane filtration this means that the particle size of the starting materials can be chosen almost freely, so that this particle size can be adjusted optimally, independently of the nature of the process apparatus. As compared with the situation in the conventional batch filtration this is a great advantage. For in batch filtration there are hardly any possibilities of varying the particle size, because this will immediately lead to problems in the wort filtration.

The cooled wort can be fermented, optionally after residence in a buffer vessel. The invention therefore also relates to a process for brewing beer using the wort prepared as described above.

The invention will now be illustrated with reference to the accompanying drawings showing an example of a process scheme according to a preferred embodiment of the invention, as well as an embodiment of two membrane filtration systems.

DESCRIPTION OF THE PREFERRED EMBODIMENTS

Figure 1:
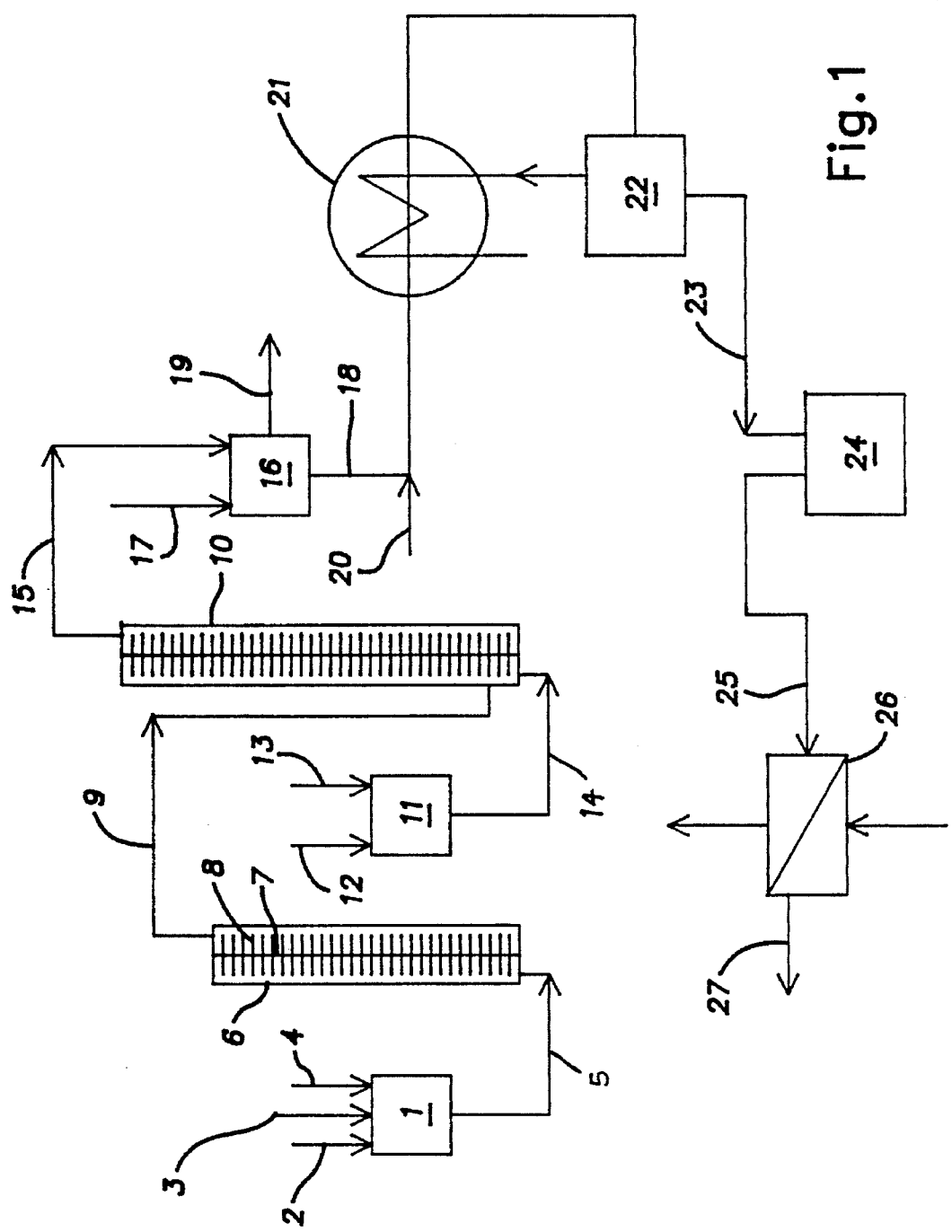
FIG. 1 shows a process scheme of a preferred embodiment of the process according to the invention.

The process scheme of FIG. 1 shows a mixer 1, to which water having a temperature of about 55° C., pulverized unmalted grain and pulverized malt are passed through lines 2, 3 and 4, respectively. After mixing, the mixture is passed through a line 5 to the first rotating disc contactor 6, which comprises an agitator shaft 7 provided with discs 8. The reactor 6 is provided with heating elements, not shown, with which the reactor contents can be adjusted to and maintained at the desired temperature.

The product from the reactor 6 is passed through a line 9 to the rotating disc contactor 10. Water or about 55° C. and pulverized malt are passed through lines 12 and 13 to a mixer 11. The resulting mixture is passed through a line 14 to the bottom of the column 10 where it is mixed after some residence time with the product from the reactor 6. Through a line 15 the resulting mash being free from prior filtering is passed to a membrane filtration 16 to which, in addition, water is passed through a line 17. Through a line 18 the clear wort obtained is discharged from the membrane filtration unit. The spent grain is discharged through a line 19.

The clear wort is mixed with hops supplied through a line 20. The mixture of wort and hops is fed to a heat exchanger 21, in which it is preheated with heat from the boiling step. The preheated wort is fed to the wort boiler 22, in which it is boiled for some time. The boiled product is passed through a line 23 to the separator 24, in which flocculated materials, such as proteins and polyphenols, are separated. The clear boiled wort then passes through a line 25 into a cooler 26, in which it is cooled. Through a line 27 the wort can be discharged, e.g., to a fermentation unit.

Figure 2:
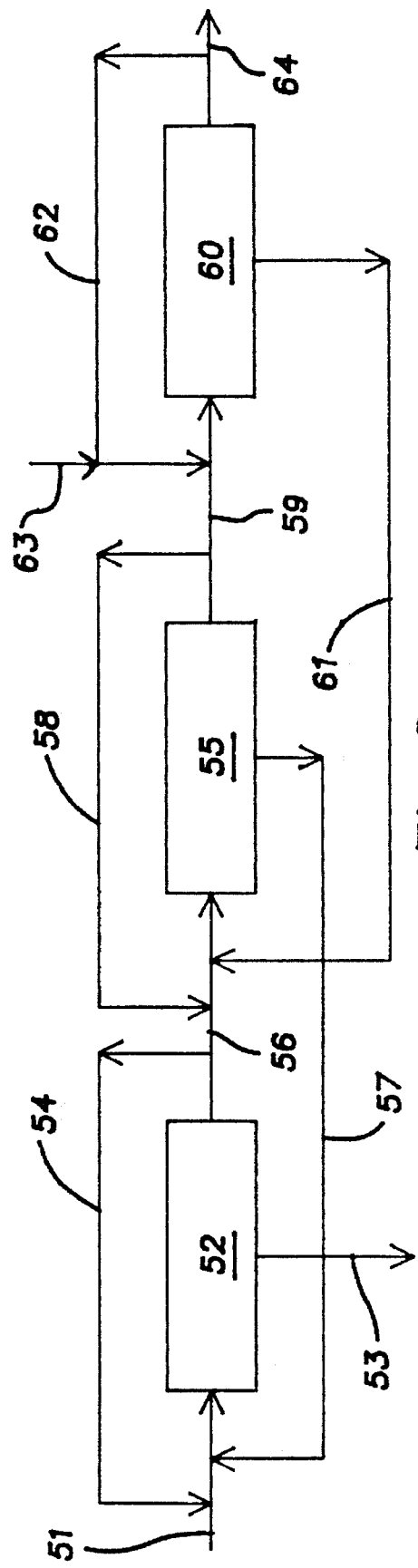
FIG. 2 shows a more detailed embodiment of the three-stage counterflow membrane filtration.

FIG. 2 shows a possible arrangement of a three-stage counterflow membrane filtration unit.

In this Figure the mash is passed through a line 51 to the first membrane filter 52, from which the clear wort is discharged through a line 53. Part of the retentate of the filter 52 is returned through a line 54 to the feed end of the filter, together with the permeate of the second membrane filter 55. The rest of the retentate is passed through a line 56 to the second membrane filter 55. The permeate of this membrane is returned through a line 57 to the first membrane filter. The retentate of the second filter 55 is partly returned to the feed end of the second membrane filter 55, through a line 58, while the rest is passed through a line 59 to the third membrane filter 60. The permeate of this third membrane filter 60 is returned through a line 61 to the feed end of the second membrane filter 55. Part of the retentate of the third filter 60 is returned through a line 62 to the feed end of the third filter 60, together with water supplied through a line 63. The rest of the retentate, the spent grain, is discharged through a line 64.

The description of this system is based on a three-stage filtration unit, but it is of course possible to adapt the number of stages as required, using the same principle.

Figure 3:
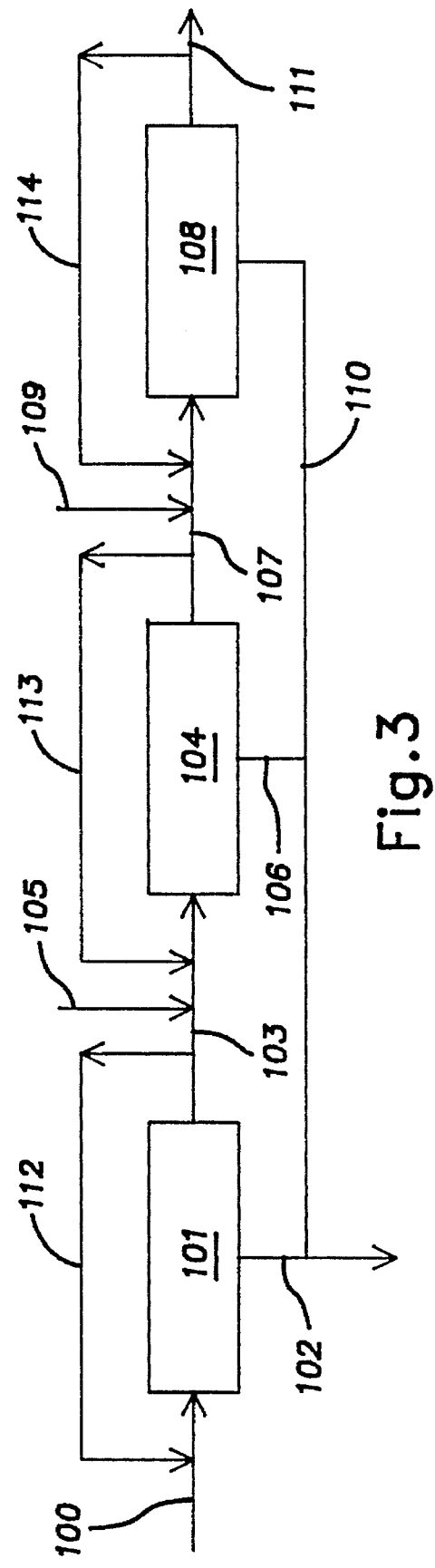
FIG. 3 shows an embodiment of a cross-flow membrane filtration.

FIG. 3 shows an embodiment of a cross-flow filtration unit, on the basis of a three-stage apparatus, but the number of stages can be adapted as required, using the same principle.

In FIG. 3 the mash is passed through a line 100 to the first membrane filter 101, from which the clear wort is discharged through a line 102. The retentate of the filter 101 is partly passed through a line 103 to the second membrane filter 104 and partly returned through a line 112 to the feed end of the filter 101. Through a line 105 water is passed to the feed end of the filter 104. The permeate of the membrane filter 104 is discharged through a line 106 and combined with the permeate of the first membrane filter 101. The retentate of the second filter 104 is partly passed through a line 107 to the third membrane filter 108, together with water supplied through a line 109, and partly returned through a line 113 to the feed end of filter 104. The permeate of this third membrane filter 108 is combined through a line 110 with the permeate of the first two filters. The rest of the retentate, the spent grain, is partly discharged through a line 111 and partly returned through a line 114 to the feed end of the filter 108.

The invention will be further illustrated with reference to an Example, but is not limited thereto.

EXAMPLE

To the mixer 1 of an apparatus as shown in FIG. 1 are added per hour 5 kg maize, 2.5 kg malt and 22.5 l water having a temperature of 55° C. The maize and the malt were pulverized in a hammer mill to a particle size that can pass through a 1.5 mm screen. The mixture had a temperature of 50° C. The mixture was passed to a rotating disc contactor, in which the temperature was increased to 95° C. The total residence time of the mixture at 50° C. was 5 min., while the residence time at 95° C. was 10 to 15 min.

To mixture 11 were added per hour 15 kg malt of the same particle size and 45 l water having a temperature of 55° C. The mixture obtained therein had a temperature of 50° C. and was passed to the bottom of the second rotating disc contactor.

The product from the first rotating disc contactor was passed to the second rotating disc contactor at such a level that the residence time of the malt/water mixture was about 15 min. at 50° C. By admixing the hot product the temperature increased to 65° C. This temperature was maintained for 30 min., after which it was raised to 76° C., which temperature was maintained for another 5 min.

After this treatment a mash was obtained having an extract content of about 21.5%, which was passed to the membrane filtration unit 16. This unit was as shown in FIG. 2. The membrane filtration using membranes having a pore size of 0.4 μm gave a wort having a clarity of 0.3 EBC units (at 65° C.). After mixing with hops, boiling, separating flakes formed and cooling, a cold wort having a temperature of 8° C. was obtained, which could be fermented to beer.

What is claimed is:

1. A process for the preparation of wort starting from mash, said mash comprising spent grain and being free from prior filtering, said process comprising introducing said mash into at least one membrane filtration unit for membrane filtration of the spent grain from the mash to form a clear wort having a clarity of from 0.25 to 5 EBC units at 65° C., if desired followed by addition of hops to the wort and boiling of the wort, wherein the membranes in the said filtration unit have a pore size effective to filter the wort from the mash, said pore size not exceeding 2.0 μm.

2. A process as claimed in claim 1, wherein the membrane filtration is carried out in a multi-stage counterflow filtration unit or a cross-flow filtration unit.

3. A process as claimed in claim 2, wherein the membrane filtration is carried out in a three-stage counterflow filtration unit.

4. A process as claimed in claim 1, wherein the clear wort is boiled with recovery of at least part of the heat.

5. A process as claimed in claim 1, wherein the mash is obtained by continuous enzymatic conversion of a mixture of malt and water in a plug flow reactor.

6. A process as claimed in claim 1, wherein the mash is obtained by continuous gelatinization and enzymatic liquefaction of unmalted grain in a plug flow reactor, addition of malt and/or an enzyme source to the resulting product and continuous enzymatic conversion in a second plug flow reactor.

7. A process as claimed in claim 5, wherein a rotating disk contactor is used as the plug flow reactor.

8. A process for brewing beer, comprising the preparation of wort using the process as claimed in claim 1, followed by the fermentation of said wort.

9. A process for the preparation of a clear wort from a starting mash, said starting mash comprising spent grain, said process consisting essentially of the steps of providing said starting mash from a unit which produces mash and introducing said provided starting mash into at least one membrane filtration unit having membranes and separating the spent grain from the mash by means of said at least one membrane filtration unit to form a clear wort having a clarity of from 0.25 to 5 EBC units at 65° C., said membranes having a pore size effective to filter the wort from the mash, said pore size not exceeding 2.0 μm.

10. A process as claimed in claim 9, wherein the membrane filtration is carried out in a multi-stage counterflow filtration unit or a cross-flow filtration unit.

11. A process as claimed in claim 10, wherein the membrane filtration is carried out in a three-stage counterflow filtration unit.

12. A process as claimed in claim 9, wherein the clear wort is boiled with recovery of at least part of the heat.

13. A process as claimed in claim 9, wherein the mash is obtained by continuous enzymatic conversion of a mixture of malt and water in a plug flow reactor.

14. A process as claimed in claim 9, wherein the mash is obtained by continuous gelatinization and enzymatic liquefaction of unmalted grain in a plug flow reactor, addition of malt and/or an enzyme source to the resulting produce and continuous enzymatic conversion in a second plug flow reactor.

15. A process as claimed in claim 13, wherein a rotating disc contactor is used as the plug flow reactor.

16. A process for brewing beer, comprising the preparation of wort using the process as claimed in claim 9, followed by the fermentation of said wort.

\* \* \* \* \*

UNITED STATES PATENT AND TRADEMARK OFFICE
CERTIFICATE OF CORRECTION

PATENT NO. : 5,453,285
DATED : September 26, 1995
INVENTOR(S) : Christiaan W. Versteegh It is certified that error appears in the above-indentified patent and that said Letters Patent is hereby corrected as shown below:

On the title page, item [22], delete "Jan. 10, 1991" and insert --Jan. 10, 1992--.

On the face of the patent, Primary Examiner, delete "Czasa" and insert --Czaja--.

Col. 1, line 14, after "for example maize)" add --and water--.

Col. 2, line 41, delete "therefore" and add --therefor--.

Col. 2, line 50, delete "therefore" and add --therefor--.

Col. 4, line 19, after "mash" add --,--.

Col. 4, line 19, after "filtering" add --,--.

Col. 4, line 20, after "16" add --,--.

Col. 4, line 29, delete "floculated" and add --flocculated--.

Col. 6, line 48, delete "produce" and add --product--.

Signed and Sealed this

Second Day of April, 1996

Attest:

BRUCE LEHMAN

Attesting Officer

Commissioner of Patents and Trademarks